Jan. 2, 1940.                H. R. TEAR                2,185,281
                              FILTER
                        Filed Sept. 19, 1936
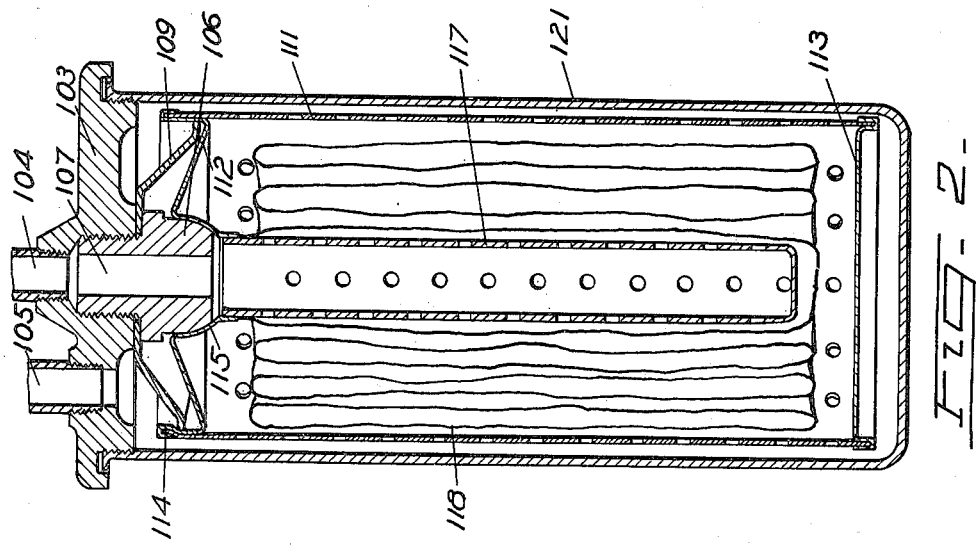
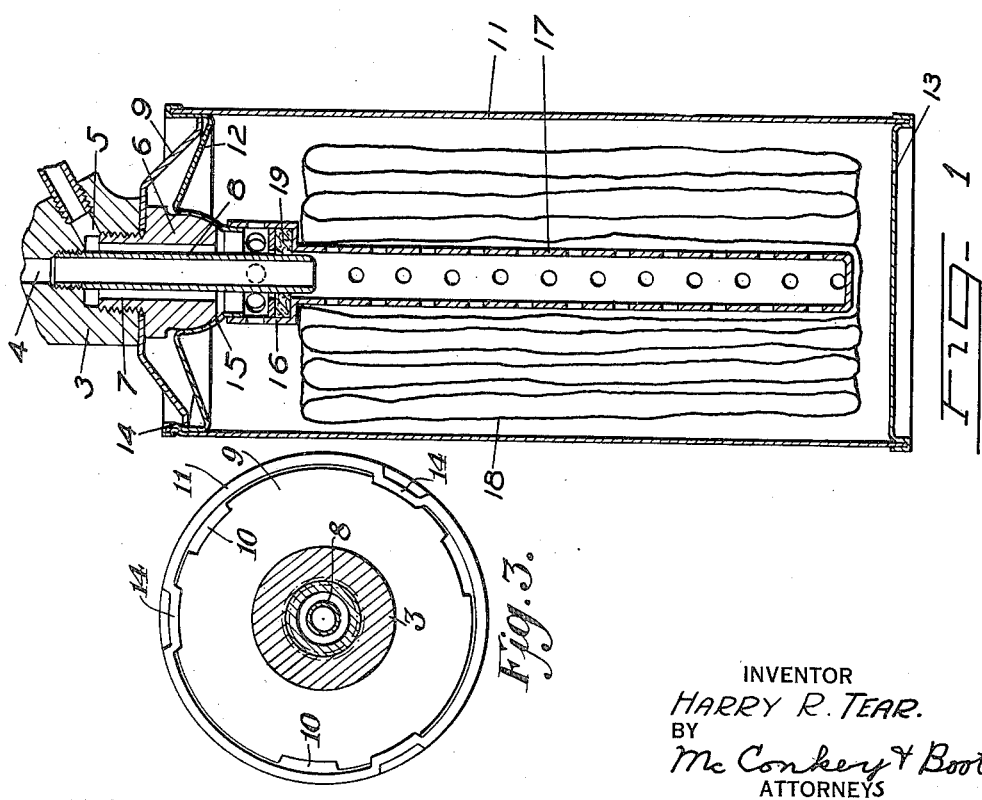
INVENTOR
HARRY R. TEAR.
BY
McConkey & Booth
ATTORNEYS Patented Jan. 2, 1940

2,185,281

UNITED STATES PATENT OFFICE 2,185,281

FILTER

Harry R. Tear, Evanston, Ill., assignor to The Lubrication Corporation, Chicago, Ill., a corporation of Delaware Application September 19, 1936, Serial No. 101,576

7 Claims. (Cl. 210—178)

This invention relates to filters and more particularly to filters adapted for use in liquid circulating systems such as the lubricating oil systems of engines.

One of the objects of the invention is to provide a filter which can be changed quickly and easily.

Another object of the invention is to provide a filter in the form of a cartridge which can be easily attached to or detached from a circulating system.

Another object is to provide a connector stud in a liquid circulating system and a cartridge filter which can be easily attached to the stud to establish communication with the system.

According to one arrangement for carrying out the invention the system may include a stud having a tube projecting therefrom and a filter including a hollow imperforate shell or cartridge may be detachably secured to the stud by means of a bayonet connection. The cartridge includes an opening sealing against the stud and a perforated tube secured over the opening with a filter element around the perforated tube. A washer in the perforated tube divides it into two parts one of which communicates with the first tube and the other of which communicates with the stud and with the interior of the cartridge around the tube. Thus liquid circulating in the system is forced through the filter element and when it is desired to change filters the bayonet connection may be detached and a new cartridge may be attached to the stud.

Another arrangement includes a perforated cartridge having an opening to seal against a stud and surrounded by a casing which is connected in the system. In this form a stud is employed having only one passage adapted to register with a perforated tube in the cartridge and it is necessary to remove the casing before the cartridge can be changed.

Various other objects, advantages and novel features of the invention will be apparent from the following description of the embodiments illustrated on the accompanying drawing, in which:

Figure 1 is an axial section of a filter embodying the invention;

Figure 2 is a similar view of a modified construction; and

Figure 3 is a top view of the filter of Figure 1 with parts in section.

The filter of Figure 1 is particularly designed for use with an internal combustion engine or the like having a part 3 formed with bores 4 and 5 which communicate with the oil circulating system of the engine. A stud 6 formed with a partispherical outer surface and a cylindrical bore 7 is screwed into the body 3 with the bore 7 communicating with the bore 5 and a tube 8 of smaller diameter than the bore 7 is screwed into the bore 4 and projects beyond the end of the stud. The stud may also serve to secure a connector plate 9 to the part 3, the plate being formed at its periphery with a series of notches 10 and cam surfaces to make a bayonet joint as will appear later.

A cartridge of sheet metal or the like having a cylindrical body portion 11 and permanently affixed end closures 12 and 13 is adapted to be detachably secured to the plate 9 by means of integral lugs 14 in the cartridge end which cooperate with the notches and cam surfaces in the connector plate to make a bayonet joint. The end closure 12 is formed with an opening defined by an inturned flange 15 having a spherical surface to seal against the surface of the stud 6 to form a liquid tight joint therewith when the cartridge is connected to the plate 9.

A perforated tube having an enlarged upper end 16 is secured to the flange 15 and has an elongated portion 17 perforated throughout its length and extending substantially to the end 13 of the cartridge. A filter element shown as a spiral filter bag 18 is secured to the tube 17 below the portion 16 and a washer 19 of felt, leather or the like is mounted in the tube portion 16 to separate the portions 16 and 17. When the cartridge is attached to the part 3 as shown, the tube 8 will project through and seal against the washer 19 to establish communication between the tubes 8 and 17.

Oil may be forced into the cartridge through the bore 4 and tubes 8 and 17, passing through the perforations in the tube 17 and into the filter bag 18. It will be noted that the bag 18 has a large area so that the oil will pass through it with a low velocity and will be relieved of foreign matter before entering the cartridge. From the cartridge the cleaned oil will flow out through the perforations in the tube portion 16, the passage 17 around the tube 8 and the bore 5 back into the system.

When a filter becomes so dirty as to lose its effectiveness or to present too high a resistance to flow the cartridge body may be turned to release the bayonet joint formed by the plate 9 and lugs 14 and the whole cartridge may be removed. A new cartridge may then be attached, the whole exchange occupying only a few seconds and being performed without the use of tools.

Figure 2 illustrates a modified construction, parts therein corresponding to like parts in Figure 1 being indicated by the same reference numbers plus 100. In this form the passage 105 is spaced from the passage 104 and stud 106, and the tube 8 is omitted. The cartridge wall 111 is perforated and the entire cartridge is enclosed in a casing 121 which is screw-threaded to the machine part 103. Oil or other liquid to be filtered may flow in at the bore 104, through the tube 117, the filter element 118 and the perforated wall 111 into the casing 121 and out through the passage 105. When it is desired to replace the filter the casing 121 may be unscrewed and the cartridge removed and replaced in the same manner as described above in connection with Figure 1. Then, after the casing 121 is replaced, the device is again ready for use.

While two embodiments of the invention have been shown and described, it will be apparent that numerous changes might be made therein and it is not intended that the scope of the invention shall be limited to the forms shown or otherwise than by the terms of the appended claims.

What is claimed is:

1. A filter comprising a hollow body having permanently fixed end closures, one of said closures being provided with an opening for flow of liquid, the walls of said opening having a concave form, a convex stud connected in a liquid circulating system for sealing engagement with the walls of said opening, spaced lugs formed adjacent the periphery of the end of the body adjacent said opening to form a bayonet joint with a connecting member associated with the stud, and a filter element in the body to filter liquid flowing therethrough.

2. A filter comprising a hollow body having permanently fixed end closures, one of said closures being provided with an opening for flow of liquid, the walls of said opening having a concave form, a convex stud connected in a liquid circulating system for sealing engagement with the walls of said opening, spaced lugs formed adjacent the periphery of the end of the body adjacent said opening to form a bayonet joint with a connecting member associated with the stud, a perforated tube in the body communicating with said opening, and a filter element in the body around the tube to filter liquid flowing through the body and tube.

3. In a liquid circulating system in combination a stud through which liquid is circulated, a bayonet connector plate rigidly secured to the stud, a filter comprising a hollow body formed at one end with an opening shaped for sealing engagement with the stud and with a plurality of lugs adjacent its periphery to make a bayonet joint with said plate, the walls of said opening sealing against said stud when said lugs engage the plate to form a liquid tight joint, and a filter element in the body to filter liquid flowing therethrough.

4. In a liquid circulating system, a stud formed with a convex surface and having an opening therethrough, a tube projecting from said stud and spaced from the walls of the opening to form a passage around the tube, a filter including an imperforate shell having an opening in one end defined by concave walls which are formed to seal against said stud whereby the interior of the shell communicates with said passage, means in the shell to seal against said tube, and a filter element in the shell arranged between said means and the interior of the shell whereby liquid flowing between said passage and said tube must pass through the filter element.

5. In a liquid circulating system, a stud having an opening therethrough, a tube projecting from said stud and spaced from the walls of the opening to form a passage around the tube, a filter including an imperforate shell having an inturned flange at one end formed to seal against the stud and defining an opening, a perforated tube connected to said flange, means in the tube to seal against said first-named tube, said means dividing the perforated tube into an upper part communicating with said passage and a lower part communicating with the first-named tube, and a filter element in the shell between the upper and lower parts of the perforated tube.

6. In a liquid circulating system, a stud having a convex surface and an opening therethrough, a fastening member secured to the stud, a filter comprising a cylindrical body containing filtering material and having an opening in one end defined by a concave wall shaped to seal against the convex surface of the stud whereby the interior of the body communicates with said opening, and fastening means adjacent the periphery of said one end of the body formed for engagement with said fastening member to secure the body to the stud.

7. In a liquid circulating system, a stud having a convex surface formed with an inlet and an outlet opening therethrough, a fastening member secured to the stud, a filter comprising a cylindrical imperforate shell having an opening in one end defined by concave walls formed for sealing engagement with said stud, said shell having means for separately communicating with said inlet and outlet openings, filtering material in said shell in the path of flow between said means, and fastening means adjacent the periphery of said one end of the shell formed for engagement with said fastening member to secure the shell to the stud.

HARRY R. TEAR.